United States Patent [19]
Fletcher et al.

[11] 3,749,156
[45] July 31, 1973

[54] THERMAL CONTROL SYSTEM FOR A SPACECRAFT MODULAR HOUSING

[76] Inventors: James C. Fletcher, Administrator of the National Aeronautics and Space Administration with respect to an invention of; Robert J. Eby, Gaithersburg; Edward I. Powers, Silver Spring, both of Md.

[22] Filed: Apr. 17, 1972

[21] Appl. No.: 244,523

[52] U.S. Cl................. 165/32, 165/96, 165/105, 244/1 SS, 165/47
[51] Int. Cl................. G05d 23/00, F28d 15/00
[58] Field of Search................ 165/32, 96, 105, 165/47; 244/1 SS

[56] References Cited
UNITED STATES PATENTS

| | | |
|---|---|---|
| 3,378,449 | 4/1968 | Roberts et al. ............... 165/105 X |
| 3,450,195 | 6/1969 | Schnacke ..................... 165/105 X |
| 3,489,203 | 1/1970 | Fischell ....................... 165/105 X |
| 3,519,490 | 7/1970 | Lieberman ..................... 165/32 X |
| 3,520,734 | 7/1970 | Scheve et al. .................. 165/32 X |
| 3,532,158 | 10/1970 | Hiebert ....................... 165/105 X |
| 3,548,930 | 12/1970 | Byrd ........................... 165/105 |

Primary Examiner—Albert W. Davis, Jr.
Attorney—R. F. Kempf, John R. Manning et al.

[57] ABSTRACT

This disclosure includes a thermal control system for a spacecraft module wherein certain wall structures of said module are constructed of superinsulation and others of thermally conductive material, thermal louvres and a plurality of heat pipes to provide a path of heat transfer from the interior of the module to space permitting a relatively uniform temperature to be maintained throughout the module at all times with a relatively wide variation of the amount of heat dissipated by components within the module.

9 Claims, 6 Drawing Figures

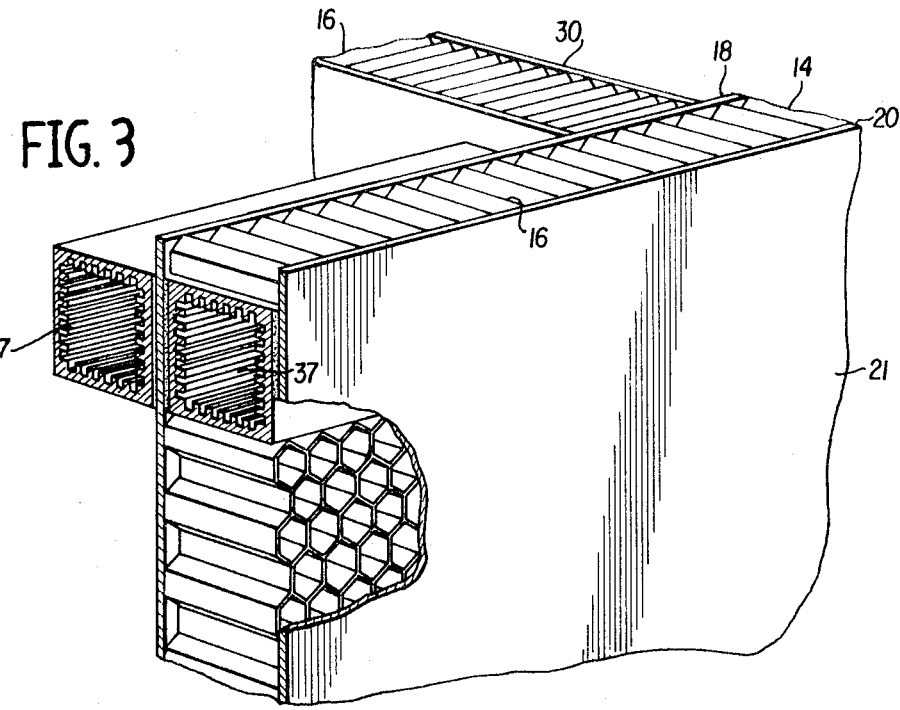
FIG. 3
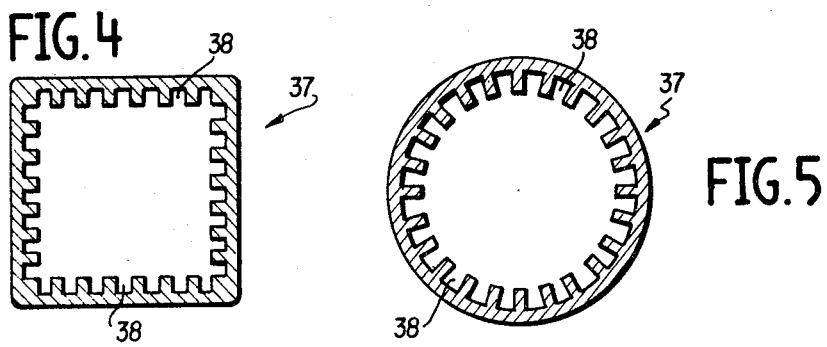
FIG. 4
FIG. 5
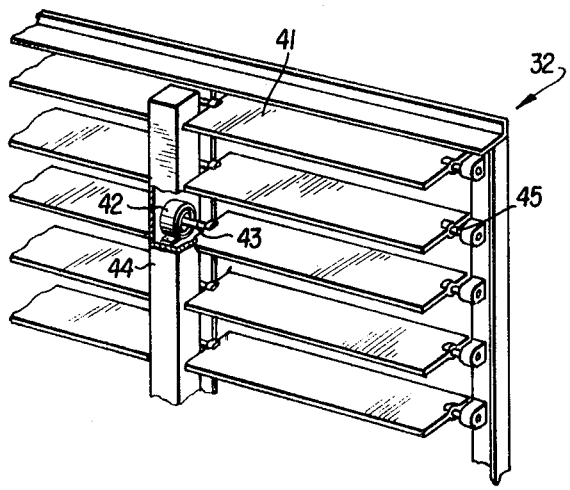
FIG. 6

THERMAL CONTROL SYSTEM FOR A SPACECRAFT MODULAR HOUSING

ORIGIN OF THE INVENTION

The invention described herein was made in the performance of work under a NASA contract and is subject to the provisions of Section 305 of the National Aeronautics Space Act of 1958, Public Law 85-568 (72 Stat. 435; 42 U.S.C. 2457).

BACKGROUND OF THE INVENTION

1. Field of the Invention

This invention relates generally to the art of thermal control systems and more particularly to such systems for use in maintaining a relatively uniform temperature throughout the interior of a spacecraft modular housing during orbit of the spacecraft irrespective of the disposition of the spacecraft around the orbit plane with large variations in the amount of heat dissipated by components within the module.

2. Description of the Prior Art

Considerable difficulty has been experienced heretofore in the art in maintaining a uniform relatively consistent temperature throughout spacecraft modular housings during periods of wide variation in power usage and differing operating modes of the spacecraft. For instance, it is necessary to maintain such a uniform consistent temperature level throughout the housing during periods of ground testing, at prelaunch, as well as ascent, and all of the various orbital phases of the spacecraft flight. Obviously, during the latter period, different sides of the spacecraft would be directed to the sun, and the potential heat transfer from sides of the spacecraft not directed to the sun would be significantly reduced. Further, during orbital flight, as well as in the other operating modes, experiments being conducted by the spacecraft may impose considerable heat loads for the time period of the experiment because of the power requirement necessary to conduct the experiment. For instance, during one recent experiment, the power usage was 443 watts whereas, during normal orbit of the spacecraft, the control systems require only 154 watts. In addition, such heat loads may occur only in certain areas of the interior of the housing, thus the temperature level may not be uniform throughout the housing interior. During these various extremes of power requirements, as well as operating modes of the spacecraft itself, the thermal control system must maintain all internal mounting plate temperatures within a 30° C. termperature excursion and must prevent temperature changes which degrade alignment accuracy of the spacecraft subsystems. In addition, and while maintaining internal mounting plate termperatures within a 30° C. temperature excursion, and in accordance with NASA requirements, the average component environment radiation surface temperature of 10° to 30° C. must be maintained.

While various systems have been employed for accomplishing the desired end of temperature uniformity within a spacecraft housing and such system have utilized certain of the individual elements comprising the thermal control system of this invention, such prior art control system have not attained the desired temperature uniformity in a practical and efficient manner.

SUMMARY OF THE INVENTION

This invention is comprised of a new and improved thermal control system for use in the construction of spacecraft modular housing units to provide an efficient transfer of heat from the spacecraft to thereby maintain a uniform temperature throughout the interior of the housing even during periods of widely varying heat loads and other thermal conditions.

The thermal control system of this invention is basically comprised of a wall structure having thermal conduction panels with opposed, spaced outer thermally conductive faceplates with means for retaining these panels in spaced relation and transmitting heat through said panels from the interior faceplate to the exterior faceplate for ultimate transfer of the heat to space or other environment, a plurality of heat pipes mounted within the wall structure and louvres on the exterior of the wall structure to selectively regulate the transfer of the heat from the wall structure. The modular unit or housing of the spacecraft is cubical in configuration having two opposed sides comprised of the aforedescribed thermally conductive panels with the remaining four sides of the spacecraft having a wall structure comprised of a superinsulation to prevent the transfer of heat either into or from the spacecraft. In normal orbital flight the thermally conductive panels would be oriented in north-south direction and only those sides of the spacecraft having the superinsulation would be subjected to direct rays of the sun. In this manner the north-south sides of the housing or module provide the positive flow path for all heat removed from the module and because of the north-south orientation the removal is effected in the most efficient and controllable manner. Further, the invention includes a means for thermally coupling the panels of the thermally conductive walls such that there is a conductive path through the interior of the spacecraft to the panels and heat sharing is effected to both conductive panels.

It is a principal object of this invention to provide a thermal control system for use in spacecraft modular housings for efficient and controlled transfer of heat from the housing in such a manner as to alleviate the aforestated difficulties in the art.

It is a further object of the invention to provide such a system employing heat pipes in combination with a heat conducting panel and louvres to rapidly transfer heat from all areas of the module to space or other environment and in this manner to maintain a uniform temperature level throughout the interior of the module within the prescribed limits of permissible temperature excursion.

It is also an object of this invention to provide such a temperature control system wherein rapid fluctuations in temperature caused by increased power loads can be efficiently handled such that the temperature within the module remains at a relatively constant level irrespective of the operational mode of the spacecraft.

It is also an object of this invention to provide such heat transfer panels in such a manner that high heat dissipating units can be mounted directly on the panels such that the heat dissipated by such units can be rapidly transferred from the module.

It is a further object of this invention to provide such a system defining a positive flow path for heat wherein walls of the module not constituting that path are insulated to prevent heat transfer therethrough.

It is a further object of this invention to provide such a temperature control system by constructing the housing in a cubicle configuration with four walls of the housing containing a superinsulating material to prevent the transfer of heat through said walls with the two remaining walls of the housing comprised of heat conducting panels having heat pipes embedded therein and with louvres on the exterior sides of said panels for controlled ejection of heat from the module.

It is also an object of this invention to provide such a system wherein the heat conducting panels are positioned on the north-south sides of the module as the spacecraft orbits the earth so that the panels are not exposed to direct rays of the sun.

Other objects and advantages of this invention will become apparent from the following description taken in connection with the accompanying drawings wherein an embodiment of this invention is set forth by way of illustration.

BRIEF DESCRIPTION OF THE DRAWINGS

FIG. 3 is a fragmentary sectional view through a portion of the exterior heat conducting panels of the module of FIG. 1 at the point of juncture of the intermediate wall, the portion of the outer faceplate being broken away to illustrate the honeycomb construction of the interior;

FIG. 4 is a sectional view through a heat pipe showing generally the channels on the interior thereof;

FIG. 5 is a modification of the pipe of FIG. 4 showing a circular configuration of such heat pipes;

FIG. 6 is a fragmentary perspective view of the rearward face of a louvre assembly capable of mounting on the exterior of the north-south walls of the spacecraft housing.

DETAILED DESCRIPTION OF THE PREFERRED EMBODIMENT

Figure 1:
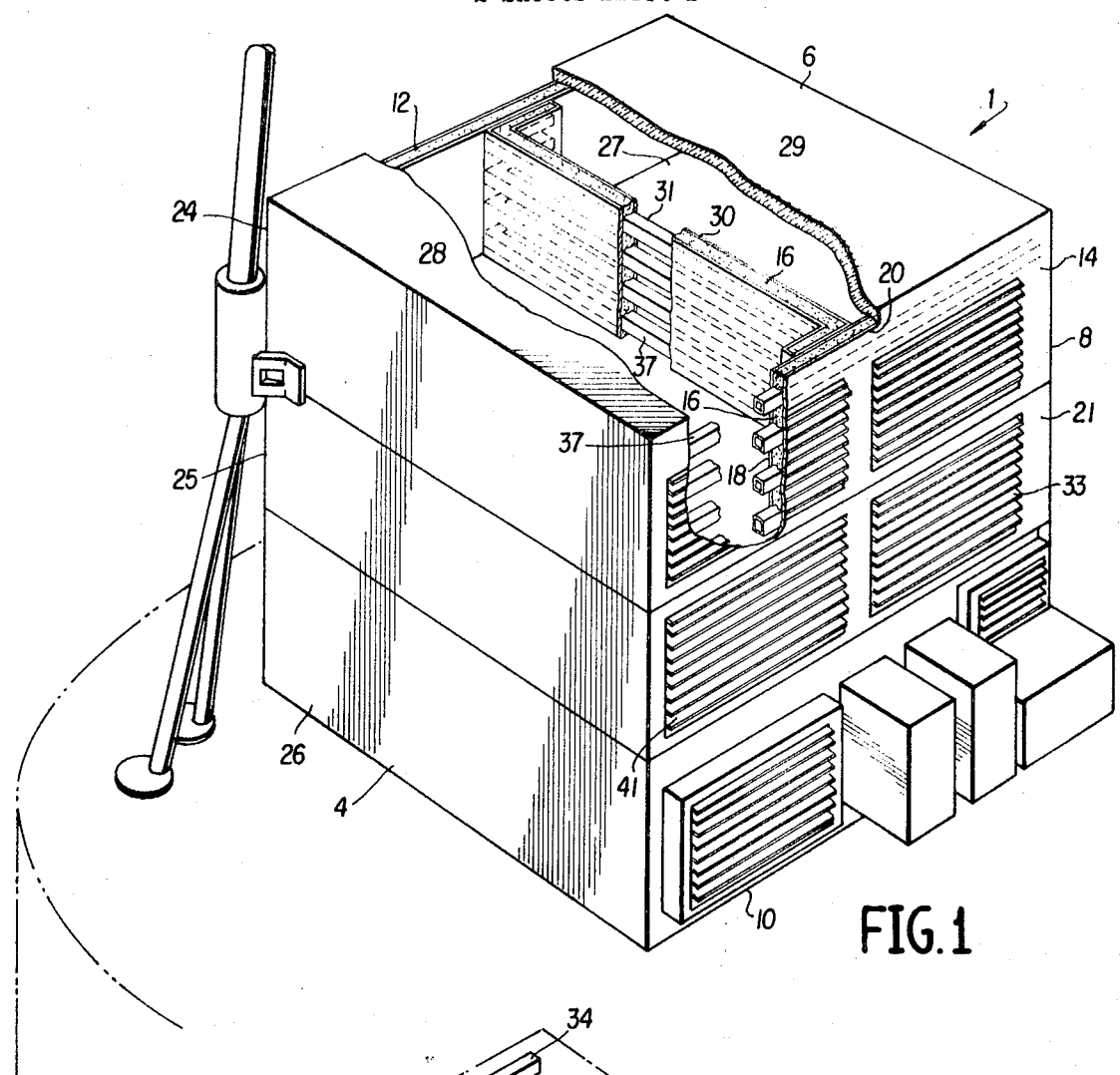
FIG. 1 is a perspective view of a spacecraft module mounted on a partially illustrated spacecraft with portions of the walls of the module broken away to illustrate the embedded heat pipes.
Figure 2:
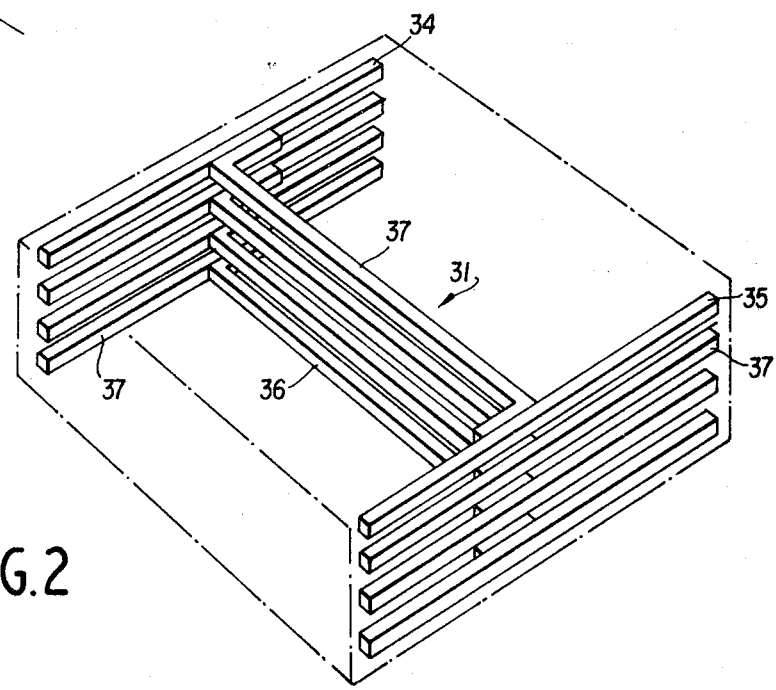
FIG. 2 is a diagrammatic view of the configuration of the heat pipes in a portion of the module, the exterior of the module being designated by broken lines.

Referring to FIG. 1, a spacecraft modular housing is illustrated as an earth-viewing module 1 mounted in a conventional manner on a spacecraft 2. The module 1 is illustrated in a cubicle configuration having at least three sides, 4, 6 and 8 subject to direct exposure to the sun's rays during orbital flight and constructed in a manner containing a superinsulating material to prevent the transfer of heat therethrough. The side of the module adjacent the spacecraft 2 and designated by the reference numeral 10 is also formed of a superinsulating material. The remaining two sides or walls of module 1 are oriented in a north-south direction during orbital flight and are designated by reference numerals 12 and 14 respectively. The north-south walls 12 and 14 are designed to facilitate the controlled transfer of heat from the module 1 to space. In this manner all significant heat transfer from module 1 is effected through the north-south walls 12 and 14 and thus control of the heat radiating capabilities of the north-south walls 12 and 14 results in control of the temperature within the module 1.

Each of the walls 12 and 14 are comprised of a honeycomb core 16, as illustrated in FIG. 3, with interior and exterior, thermally conductive 25 mil thick aluminum faceplates 18 and 20 respectively. It is desirable to cover the exterior surface 21 of faceplate 20 with a solar reflector coating to minimize solar energy input to the spacecraft housing while permitting a maximum transmission of thermal energy from the spacecraft housing. In selecting a solar reflector coating, the initial characteristic of the material and any changes in these characteristics during the mission life must be considered. Many solar reflectors are subject to optical and/or physical degradation in the space environment whereas others as well as the aforementioned may be difficult to handle, apply or maintain in the ground environment. A preferred coating is silver, vapor deposited on 8 mil thick fused silica, which is commonly termed an optical solar reflector. The material selection for the interior faceplate 18 should be a material of low insulating quality thus capable of transfer of heat in a rapid manner. Both the interior faceplate 18 and the honeycomb core 16 are preferably comprised of aluminum.

While various superinsulating materials may be utilized in walls 4, 6, 8 and 10, multilayer systems are preferable. For instance, very thin layers of material having a high infrared reflectance separated by either continuous or discontinuous layers of low conductance material may be employed. The reflective layers may be comprised of a thin film of plastic such as Mylar or Kapton supporting a vacuum-deposited layer of aluminum, silver or gold. The spacer material may be silk or nylon netting.

The housing, as illustrated, is divided into three modules 24, 25 and 26, which may or may not be separated. The horizontal disposed partition may also be comprised of the superinsulating materials. In addition, each module 24, 25 and 26 is divided into two compartments 28 and 29 by an intermediate wall or partition 30. Intermediate wall 30 is constructed like walls 12 and 14 having a honeycomb core with thermally conductive faceplates on each side thereof.

The thermal control system of the invention includes the wall structures 12, 14 and 30 of the housing as well as a heat pipe system 31 and thermal louvres 32. This control system broadly designated by reference numeral 33 provides a positive thermal path for heat transfer from the module 1 to space capable of accurate control for maintenance of the module interior within desired temperature levels.

The heat pipe system 31 within the module 1 provides a rapid and efficient means of transferring heat to the north-south walls 12 and 14 in a manner effecting heat sharing between these walls as well as distributing that heat uniformly across those walls. The heat pipe system 31, as illustrated, is comprised of three series of heat pipes 37 in each of modules 24, 25 and 26, with pipe series 34 and 35 being embedded within the north-south walls 12 and 14 respectively of the spacecraft housing, and heat pipes series 36 within the intermediate wall 30 thus, thermally coupling the north-south walls 12 and 14. Each of the individual pipes 37 within each of the series 34, 35 and 36 are tubes closed at each end. Neither the individual pipes in each series nor the pipes of adjacent series are connected for interflow of the working fluid. Thus, the cooperation of the pipes 36 of the various series 34, 35 and 36 in providing a flow path to effect heat transfer is by thermal coupling through their associated walls, however, other modifications of this type of system could be employed to effect the desired end of a rapid and efficient transfer of heat from all areas of the spacecraft housing.

The individual heat pipes 37 illustrated in FIGS. 3 to 6 are grooved to provide condensate return channels 38. More conventional heat pipes such as those which include an interior wick material may also be utilized. In operation, the heat transfer occurs by the utilization of a change of phase of the working fluid moves through the channels of the pipe as a liquid to areas of heat input where it is converted to gas. This converted gas then moves through the pipe to areas of heat output where the gas condenses back to a liquid emitting heat during the condensation process. Thus, the series of pipes 34 and 35 in walls 12 and 14 receive varying heat loads from the interior of the housing directly or by a heat transfer from the intermediate pipe series 36. By the action of the working fluid in the pipes 37 of the series 34 and 35, a uniform distribution of heat transfer is effected across the north and south walls 12 and 14 respectively. The pipe series 36 serves to carry or transfer heat from more remote areas of the module interior directly to the north and south walls 12 and 14 respectively and to share the heat load between walls 12 and 14.

The heat pipes 37 in each of the respective walls 12, 14 and 30 are positioned as shown in FIG. 3 in side by side relation at the same elevations respectively. In this manner a maximum heat transfer is effected from the pipes 37 of the intermediate wall 30 through the side walls 12 and 14. Where heat pipes 37 are constructed of aluminum, the working fluid selected must be compatible with that metal, for instance, such fluids as acetone, ammonia and freons may be utilized. As shown in FIG. 3, the individual pipes 37 of pipe series 36 comprise a central portion which is normal to the side panels or walls 12 and 14 of the pipe series 34 and 35, and end portions which are bent 90° to be parallel to the side walls. FIG. 3 illustrates the end portions of pipes 36 to be bent in opposite directions; however they may be bent in the same direction as well.

While it is preferable to employ a heat pipe having a square or rectangular cross-section in order to provide a maximum area of contact between the faceplates 18 and 20 of the honeycomb panels, heat pipes having a circular cross-section as illustrated in FIG. 5 may also be utilized.

The thermal louvres 32 of the thermal control system are mounted on walls 12 and 14 and act as a thermal valve to control the transfer of heat from the housing to space. When the louvres are completely open maximum radiation of heat to space is effected whereas closing of the louvres minimizes the heat radiation. The position of the louvres controls the degree of radiation and thereby the temperature maintained within the housing. The size of the louvred areas on the north-south walls 12 and 14 is determined by the amount of heat dissipated. Area on the north and south walls that is not covered by louvres, is insulated in a manner similar to the other walls of the module to prevent leakage of heat. Thus, the louvres provide a variable thermal resistance which is a function of the temperature within the interior of the housing.

The louvres comprise thin, highly polished, aluminum blades 41, which are independently actuated typically in pairs by separate bimetallic sensors 42 such that failure of any one sensor will provide only minor degradation in the overall system. The bimetallic sensor functions similarly to the coiled spring in an automatic car choke and actuates the associated louvre blade at the slightest temperature change. The sensors coil around their respective shafts 43, with their inner end being connected to shaft 43 and their outer end to housing 44. The sensors are located in a housing thermally insulated from the outside influence and are responsive to the temperature of the surface to which the louvres are mounted. As the temperature increases, the bimetallic sensor contracts, creating a torque which opens the associated louvre blade a distance corresponding to the temperature increase. A decrease in temperature will cause a counter-torque to be developed, resulting in a corresponding closure of the blade by a distance dependent upon the temperature decrease. Thus heat from the surface behind the louvre escapes by radiation through the open blade into space. The bimetallic sensor system is conventional in nature having been employed on many spacecraft.

The blades 41 may be constructed of a highly-polished, specular finish aluminum and are mounted in a light-weight polished aluminum frame which contains low-friction pivots 45 at each end of the respective blades to facilitate the movement of the blades.

What is claimed is:

1. A thermal control system for an enclosure having space application wherein said enclosure comprises
   a. a wall structure comprised of a thermal conduction panel having opposed, spaced, outer thermally conductive interior and exterior faceplates and means for retaining said plates in said spaced relation and transmitting heat through said panels;
   b. a plurality of heat pipes mounted in said wall structure between said faceplates and thermally coupled to said plates, said heat pipes being comprised of a closed tube and having a working fluid in said tube, said fluid being capable of conversion to a gas and being condensed back to a liquid within a desired working temperature range.
   c. louvre means operatively mounted on the exterior of said wall structure and actuated responsively to the temperature level of the panel to which the louvre is mounted for resisting the transfer of heat from the panel when in a closed position and permitting heat transfer from said panel when in an open position.

2. A thermal control system as recited in claim 1 wherein the exterior plate has a highly reflective coating of fused silica with a layer of vapor deposited silver thereon comprising the exterior surface thereof.

3. A thermal control system as recited in claim 1 wherein said wall structure is comprised of at least two spaced opposed thermally conductive panels forming opposite sides of said enclosure and means for thermally coupling said panels together, each of said panels having said heat pipes mounted therein and said louvres operatively mounted thereon.

4. A thermal control system as recited in claim 3 wherein said means for thermally coupling said panels is comprised of a plurality of heat pipes extending between and thermally coupled to said panels.

5. A thermal control system as recited in claim 4 wherein said means for thermally coupling said panels includes a third thermally conductive panel having said heat pipes mounted therein, said third panel extending between and being thermally coupled to said side panels.

6. A thermal control system as recited in claim 3 wherein said enclosure is of a cubical configuration with said thermally conductive panels comprising two opposed sides of said enclosure and the four remaining sides of said enclosure are comprised of wall structures having superinsulation to prevent the transmission of heat therethrough and thus define a positive flow path for heat transfer.

7. A thermal control system as recited in claim 6 wherein said means for thermally coupling said side panels is comprised of a plurality of heat pipes mounted in an intermediate wall structure, said intermediate wall structure being comprised of said thermally conductive panel and having said heat pipes mounted between the faceplates of said panel and thermally coupled to said faceplates.

8. A thermal control system as recited in claim 6 forming an integral part of a spacecraft module wherein said thermally conductive panels comprise the north and south sides of the module which are not exposed directly to the rays of the sun during orbital flight of the spacecraft.

9. A thermal control system as recited in claim 7 wherein said plurality of heat pipes mounted in the intermediate wall structure includes a pair of opposite end portions and a central portion and wherein said central portion extends normally to said side panels and said end portions extend parallel to said side panels, said opposite end portions being thermally coupled to said side panels whereby heat from said end portions of the heat pipes of the intermediate wall structure is transferred to said side panels for ultimate transmission to the exterior of said enclosure.

* * * * *